United States Patent
Dakshinkar et al.

(10) Patent No.: US 11,665,682 B2
(45) Date of Patent: May 30, 2023

(54) SELECTIVE SPATIAL REUSE TO ENHANCE NETWORK PERFORMANCE

(71) Applicant: HEWLETT PACKARD ENTERPRISE DEVELOPMENT LP, Houston, TX (US)

(72) Inventors: Abhiruchi Dakshinkar, Santa Clara, CA (US); Eldad Perahia, Park City, UT (US); Gaurav Patwardhan, Santa Clara, CA (US); Nitin A. Changlani, Santa Clara, CA (US); Sachin Ganu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 104 days.

(21) Appl. No.: 17/319,003

(22) Filed: May 12, 2021

(65) Prior Publication Data

US 2022/0369314 A1    Nov. 17, 2022

(51) Int. Cl.
*H04L 12/28* (2006.01)
*H04W 72/0453* (2023.01)
*H04J 1/16* (2006.01)
*H04W 84/12* (2009.01)

(52) U.S. Cl.
CPC ........ *H04W 72/0453* (2013.01); *H04W 84/12* (2013.01)

(58) Field of Classification Search
CPC .... H04L 27/2602; H04W 72/12; H04W 84/12
USPC ................. 370/252, 329, 389, 386
See application file for complete search history.

(56) References Cited

U.S. PATENT DOCUMENTS

| | | | |
|---|---|---|---|
| 10,470,214 B2 | 11/2019 | Lee et al. | |
| 10,575,249 B2 | 2/2020 | Park | |
| 10,749,996 B2 | 8/2020 | Noh et al. | |
| 2016/0014549 A1* | 1/2016 | Jones | H04W 4/80 455/41.1 |
| 2020/0177425 A1 | 6/2020 | Chen et al. | |
| 2022/0158505 A1* | 5/2022 | Choi | H04B 1/005 |
| 2022/0369335 A1* | 11/2022 | Malichenko | H04W 72/1231 |

OTHER PUBLICATIONS

Wilhelmi, F., et al. Spatial Reuse in IEEE 802.11ax WLANs (Research Paper) Jul. 2019, 21 Pgs.

* cited by examiner

*Primary Examiner* — John Pezzlo
(74) *Attorney, Agent, or Firm* — Sheppard Mullin Richter & Hampton LLP

(57) ABSTRACT

Currently, spatial reuse (SR) is a feature used indiscriminately for/across all traffic classes. However, systems and methods are provided for increasing the reliability of voice traffic and Transmission Control Protocol (TCP) Acknowledgement (ACK) messaging. The result is improved quality of voice calls, and enhanced network capacity. When the length of a data section of a packet suggests that subsequent packets are associated with voice traffic or TCP ACKs, such packets are not transmitted when another transmission(s) is occurring under spatial reuse. When a determination is made that the length of a data section of the packet suggests non-voice traffic or TCP ACKs, they can be transmitted simultaneously with other transmissions occurring under spatial reuse.

11 Claims, 6 Drawing Sheets

HE SU PPDU FORMAT

| L-STF 400 | L-LTF 402 | L-SIG 404 | RL-SIG 406 | HE-SIG-A 408a | HE-STF 410 | HE-LTF 412a | ... | HE-LTF 412n | Data 414 | PE 416 |
|---|---|---|---|---|---|---|---|---|---|---|
| 8 μs | 8 μs | 4 μs | 4 μs | 8 μs | 4 μs | | | | | |

FIG. 4A

HE MU PPDU FORMAT

| L-STF 400 | L-LTF 402 | L-SIG 404 | RL-SIG 406 | HE-SIG-A 408a | HE-SIG-B 408b | HE-STF 410 | HE-LTF 412a | ... | HE-LTF 412n | Data 414 | PE 416 |
|---|---|---|---|---|---|---|---|---|---|---|---|
| 8 μs | 8 μs | 4 μs | 4 μs | 8 μs | 4 μs / symb. | 4 μs | | | | | |

FIG. 4B

HE ER SU PPDU FORMAT

| L-STF 400 | L-LTF 402 | L-SIG 404 | RL-SIG 406 | HE-SIG-A 408a | HE-STF 410 | HE-LTF 412a | ... | HE-LTF 412n | Data 414 | PE 416 |
|---|---|---|---|---|---|---|---|---|---|---|
| 8 μs | 8 μs | 4 μs | 4 μs | 16 μs | 4 μs | | | | | |

FIG. 4C

HE TB PPDU FORMAT

| L-STF 400 | L-LTF 402 | L-SIG 404 | RL-SIG 406 | HE-SIG-A 408a | HE-STF 410 | HE-LTF 412a | ... | HE-LTF 402e | Data 414 | PE 416 |
|---|---|---|---|---|---|---|---|---|---|---|
| 8 μs | 8 μs | 4 μs | 4 μs | 8 μs | 8 μs | | | | | |

FIG. 4D

SELECTIVE SPATIAL REUSE TO ENHANCE NETWORK PERFORMANCE

DESCRIPTION OF RELATED ART

Large scale proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing features like Spatial Reuse (SR) and Basic Service Sets (BSS) Color schemes. These schemes are intended to improve network throughput and spectrum efficiency in dense environments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 4A-4D illustrate example Physical Layer Protocol Data Unit (PPDU) formats.

Figure 1:
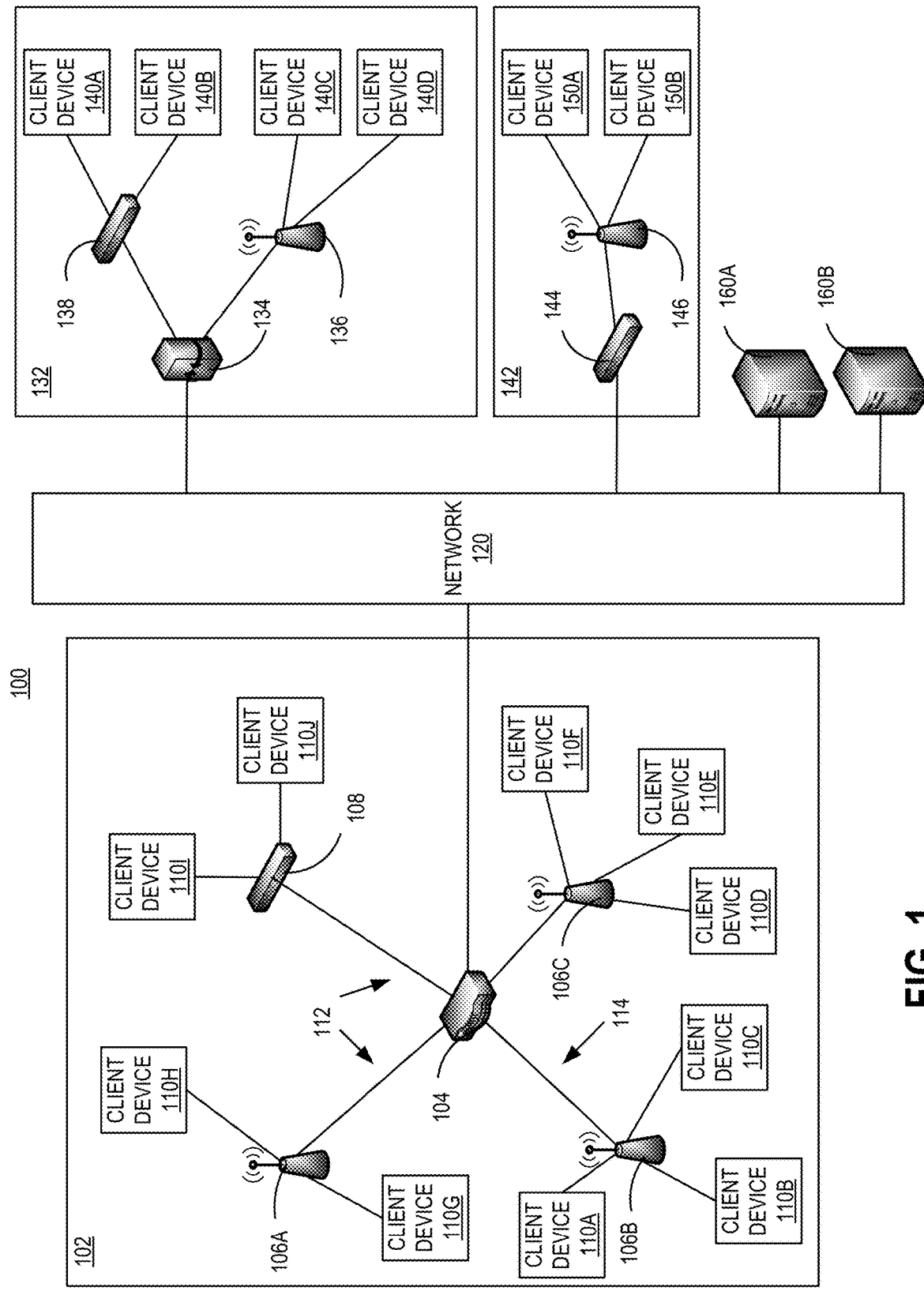
FIG. 1 illustrates one example of a wireless network deployment that may be implemented for an organization, such as a business, educational institution, governmental entity, healthcare facility or other organization.

The figures are not exhaustive and do not limit the present disclosure to the precise form disclosed.

DETAILED DESCRIPTION

As noted above, certain schemes are intended to improve network throughput and spectrum efficiency in dense environments, one being frequency or spatial reuse (SR). This SR feature allows two or more devices existing in different, adjoining basic service sets (BSSs) in the same frequency channel to transmit simultaneously if certain conditions are met. These conditions are described by using different CCA (Clear Channel Assessment) levels for inter-BSS and intra-BSS frames on the same channel. The distinction between inter and intra-BSS frames is given by the color parameter embedded in a packet by the respective BSS. Depending on the CCA thresholds for inter-BSS vs intra-BSS frames, one access point (AP) or device may defer medium access to the other AP or device depending on the BSS where the packet originated.

In particular, the introduction of SR was intended to enhance system level throughput by allowing traffic in a BSS to overlap in time and frequency with another BSS (also referred to as Overlapping BSS or OBSS). According to the 802.11 specification, the objective of High Efficiency (HE) SR operation is to allow the medium to be reused more often between OBSSs in dense deployment scenarios by the early identification of frames from OBSSs and interference management. One of the methods to accomplish this is OBSS Packet-Detect (OBSS_PD)-based SR. OBSS_PD-based SR is achieved by manipulating the preamble detect thresholds and transmit power, e.g., Effective Isotropic Radiated Power (EIRP) of APs and non-AP client devices or stations (STAs) in the entire BSS. For example, allowing STAs in the BSS to use a less sensitive preamble detection threshold for OBSS frames during a CCA check results in allowing STAs to transmit packets despite an OBSS frame currently being transmitted (so long as there is enough SNR, described below).

OBSS_PD-based SR can further be classified into (a) operation with non-Spatial Reuse Group (SRG) OBSS_PD level, and (b) operation with SRG OBSS PD level. In accordance with either manner of operation, a minimum (min_OBSS_PD_level) and maximum (max_OBSS_PD_level) packet detection level is defined for a BSS. A client device in the BSS can choose a packet detect level such that the min_OBSS_PD_level≤OBSS_PD-≤max_OBSS_PD_level, and an SR opportunity can be detected if the RSSI of the received inter-BSS PPDU≤OBSS_PD. In particular, an AP may define SRG OBSS PD Min Offset and SRG OBSS PD Max Offset values that are used by its associated STAs to derive an SRG OBSS PD level for determining reception behavior for inter-BSS PPDUs that are determined to be SRG PPDUs. An AP may define a non-SRG OBSS PD Max Offset value that is used by its associated STAs to derive a non-SRG OBSS PD level for determining reception behavior for inter-BSS PPDUs that are not determined to be SRG PPDUs.

Another variant of SR can be referred to as Parameterized SR (PSR), an opportunity for use being premised on the identification of a PSR opportunity to initiate SR for the duration of an ongoing Physical Layer Protocol Data Unit (PPDU) transmission, when certain interference-avoiding conditions (designed to avoid interfering with reception of an ongoing PPDU transmission at the recipient) are met.

SR relies on the fact that if there is high Signal-to-Noise Ratio (SNR) between two entities at a given EIRP, the receiver can withstand some interference caused by a simultaneous transmission in the vicinity, and can receive and decode packets simultaneously. This also involves not causing interference in return, and that is achieved by changing EIRP dynamically. However, in very high density AP deployments, the achievable throughput gains may be significantly constrained by the interference caused by overlapping transmissions that results in have lower SINR (Signal to Interference plus Noise ratio)

Embodiments of the present disclosure address this issue by avoiding the enablement or application of SR indiscriminately for/across all traffic types. Instead, various embodiments are directed to ensuring service reliability for "important" traffic. Because transmission media is shared when employing SR, a device is actively transmitting "over" another transmission, or while another transmission is occurring on the transmission medium. Transmitting over important traffic can prove detrimental to those services that transmit such important traffic. Thus, various embodiments identify the existence of important packets, and prohibit the use of SR (other transmissions transmitting over) the transmission of important packets. However, transmitting over other packets may be allowed when non-important traffic is being transmitted over a medium.

Some examples of important traffic are voice traffic and Transmission Control Protocol (TCP) acknowledgement (ACK) traffic/packets, although embodiments are not limited to these traffic types. Various embodiments focus on voice traffic because voice traffic is latency sensitive and has stringent packet loss requirements/constraints. Similarly, the successful transmission of TCP ACK packets helps guarantee good TCP throughput. Thus, voice traffic and TCP ACK packets are important enough such that this traffic is identified, and systems refrain from using SR while important traffic is being transmitted. Both are short packets as well that may benefit from lower airtime for transmission and shorter time overlap with overlapping SR transmission.

Various embodiments ensure reliability for such important traffic while still improving overall network capacity by (selective) exploitation of SR. Refraining from or prohibiting the use of SR when important traffic is being transmitted can increase the chances of successful packet delivery in an SR-enabled network. However, SR can be used when other, non-important traffic is being transmitted, thus still improving network capacity. In other words, an AP can engage in SR when other, non-important traffic is being transmitted over a medium/channel.

Before describing embodiments of the disclosed systems and methods in detail, it is also useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a j*, 140*a-d*, 150*a-b* may request and access the multimedia content provided by the content servers 160*a-b*.

Although 10 client devices 110*a-j*, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time. As noted above, various IEEE 802.11 networks may implement what is referred to as BSS coloring to increase network capacity in such dense environments. This can allow improvement and frequency reuse among network devices.

Figure 2:
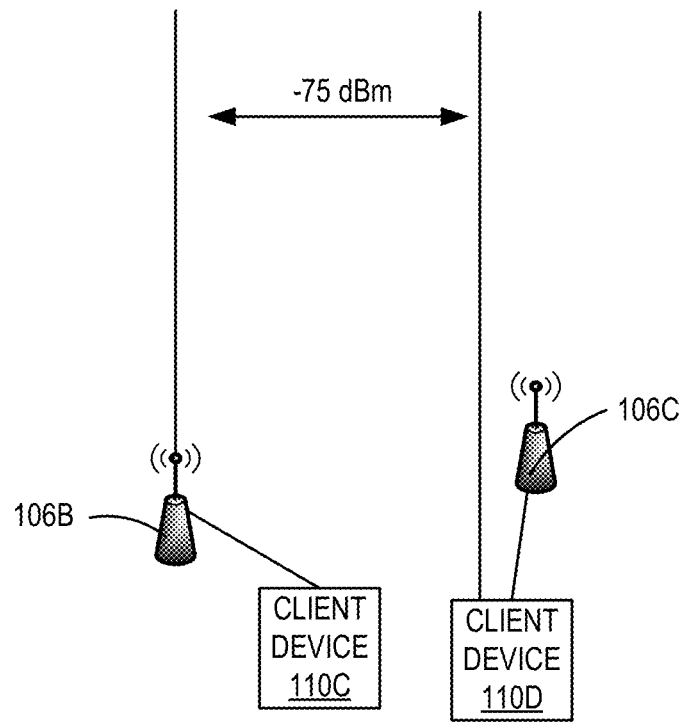
FIG. 2 illustrates an example of a spatial reuse scenario.

FIG. 2 illustrates an example of intra-BSS communication that may cause inter-BSS/OBSS interference in the context of the example network 100 (FIG. 1). In the example of FIG. 2, client device 110C (associated to AP 106B) may be transmitting data on a particular channel, e.g., channel 36, while client device 110D (associated to AP 106C) may also be operating on channel 36. Because client devices 110C and 110D are geographically close/near one another, they may be able to hear (detect) each other's transmissions above the PD threshold. Because client devices' 110C/110D respective PD thresholds are being triggered by each other's energy, client devices 110C/110D are in contention with each other. Accordingly, client devices 110C/110D will take turns accessing channel 36, with each client device getting approximately half the available bandwidth (and throughput) of channel 36, but they will not necessarily interfere with each other. That is, client device 110C's energy is not considered to be interference by AP 106C as it is too far away, while client device 110D's energy is not powerful enough to be heard by AP 106B, but client devices 110C/110D are close enough to interfere, and so are prevented by the CCA function from transmitting simultaneously on channel 36. It should be understood that the above is only an example, and that inter-BSS/OBSS interference can occur between, e.g., two APs, or between an AP and a client device.

However, with SR, client devices 110C/110D can coordinate with one another and can be allowed to transmit data at the same time with a high likelihood of success because AP 106B cannot hear client device 110D, and AP 106C cannot hear client device 110C. Thus, neither of APs 106B/106C experiences interference from another's communications. The coordination comes about from the recognition (on a packet-by-packet basis) where a packet belongs to one BSS/BSSID or another BSS/BSSID. This determination can be accomplished using BSS coloring. It should be understood that the "color" is an index number, e.g., from 1 to 63, assigned to individual APs along with channel assignment, whether manually, through self-automated determination, or via external automated determination and assignment. When APs share the same channel and are in the same vicinity, they should have different BSS colors. When two BSSs operating in the same vicinity and on the same channel have the same BSS color, a condition referred to as color collision occurs, and can be detected by a client device. The client device may then alert the AP to which it is associated, prompting the AP to announce a BSS color change (via beaconing).

With BSS coloring in use, clients 110C/110D can determine whether a frame/packet is an inter- or intra-BSS frame by inspecting the BSS Color field contained in the PHY header of the frames. For all intra-BSS frames, the default PD threshold (−82 dBm) will still be used to minimize potential interference between devices in the same BSS, but in the case of an inter-BSS frame, OBSS-PD allows a more aggressive maximum PD threshold (higher than −82 and more advantageous) to be used to create more parallel transmissions, which translates into more opportunities to leverage SR. The ability to determine BSS color quickly from the preamble lets a client device receiving an inter-BSS packet drop it without demodulating the whole packet.

OBSS-PD spatial reuse allows for adjustments to the PD threshold to be made between a minimum of −82 dBm and a maximum of −62 dBm, modifying the signal detection threshold window to take advantage of an SR opportunity. The amount of adjustment allowed would be determined by the transmit power used. Lowering the transmit power reduces the potential for interference and supports a more aggressive PD value. A lower power may reduce the data rate, but increased transmit opportunities will lower latency (for the proper traffic, e.g., high-priority/low-latency traffic).

Figure 3:
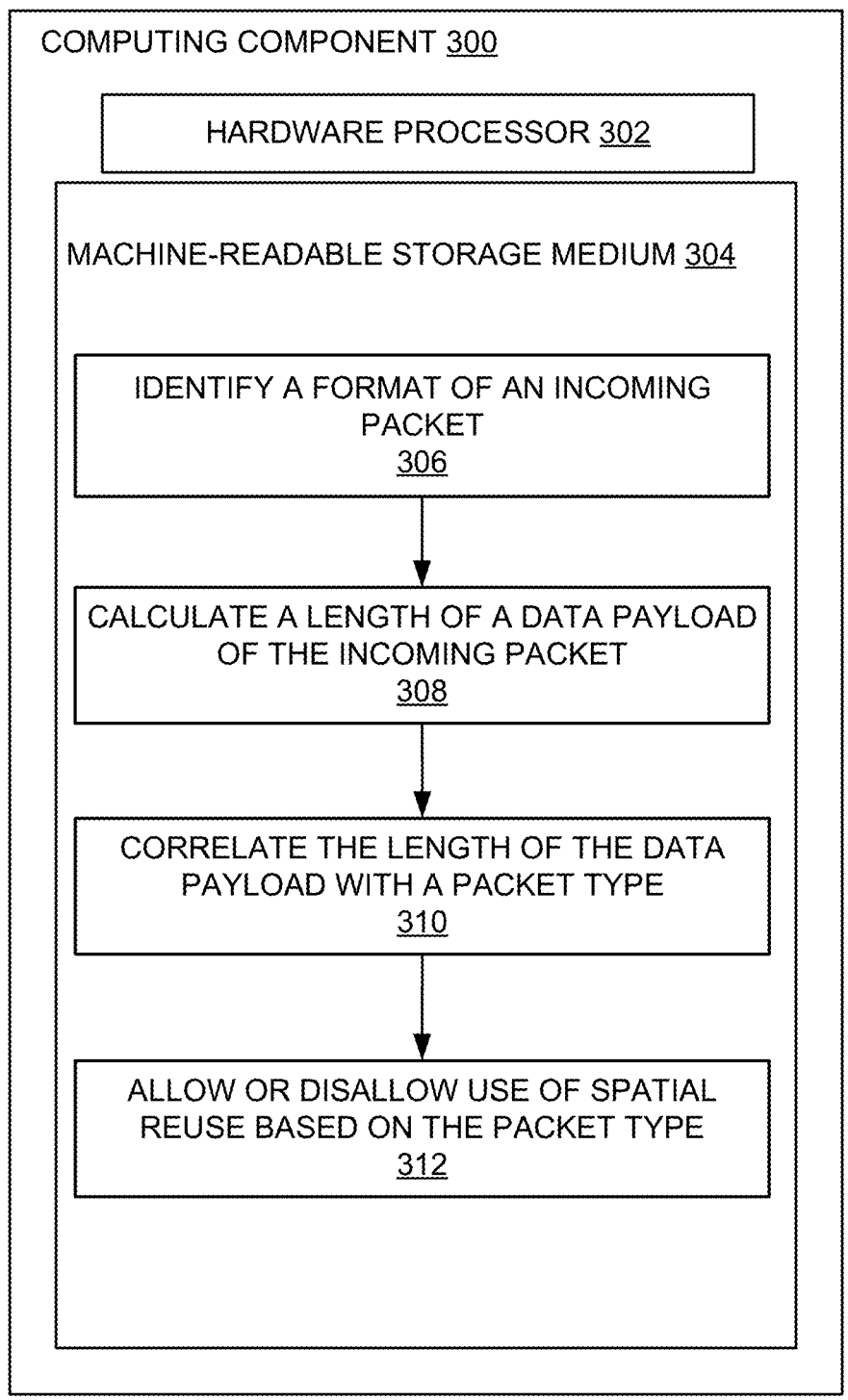
FIG. 3 is a block diagram of an example computing component or device for selective spatial reuse in accordance with one embodiment.

FIG. 3 is an example computing component 300 that may be used to implement various features in accordance with one embodiment of the disclosed technology. Computing component 300 may be, for example, a server computer, a controller, or any other similar computing component capable of processing data. In the example implementation of FIG. 3, the computing component 300 includes a hardware processor 302, and machine-readable storage medium 304. In some embodiments, computing component 300 may be an embodiment of processor of an AP or AP controller (FIGS. 1 and 2).

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-312, to control processes or operations for selective application or utilization of SR. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312.

It should be understood that both voice packets and TCP ACK packets are typically short. For example, a voice packet (described in greater detail below may be 248 bytes (most codecs capping the voice payload at 160 bytes, and a TCP ACK packet is 88 bytes. Thus, various embodiments can be premised on determining the length of data sections of incoming packets. Although it is possible to identify voice packets by examining the quality of service (QoS) control field in the Media Access Control (MAC) header of an 802.11 packet, parsing the MAC header delays the initiation of SR. As noted above, SR relies on "early" identification of an SR transmit opportunity whereby, a client device can determine BSS color quickly from a PPDU preamble, and can also determine length by parsing the preamble. Accordingly, various embodiments identify the existence of a "short packet" by determining the length of the data section in a PPDU. The length of a PPDU data section can be calculated from preamble fields.

The 802.11ax standard identifies four different formats of PPDUs/PPDU signal structures: HE Single User (SU) PPDUs; HE SU extended range (ER) PPDUs; HE Multi-User (MU) PPDU; HE trigger-based (TB) PPDUs. FIGS. 4A-4D illustrate each of these PPDU formats. FIG. 4A illustrates the HE SU PPDU format, FIG. 4B illustrates the HE MU PPDU format, FIG. 4C illustrates the HE ER SU PPDU format, and FIG. 4D illustrates the HE TB PPDU format. That is, the 802.11 standard, in general is a packet-based protocol, and each PPDU may contain a preamble and data fields. The "L-LTF" and "L-STF" fields (400, 402) refer to legacy/non-high-throughput long training field and short training field, respectively. The "L-SIG" and "RL-SIG" fields (404, 406) refer to legacy and repeated legacy/non-high throughput signal fields, respectively. The "HE-SIG-A" and "HE-SIG-B" fields (408a, 408b) refer to high efficiency signal A and signal B fields, respectively. The "HE-STF" and "HE-LTF" fields (410, 412a . . . 412n) refer to high efficiency short and long training fields, respectively. The data field 414 can refer to the packet's payload, and PE field 416 refers to the packet extension field.

Because differences exist between PPDU formats/structures, methods for calculating the length of a data section of a PPDU can differ. Thus, and returning to FIG. 3, hardware processor 302 may execute instruction 306 to identify the format of an incoming packet. The PPDU format for HE PPDUs may be identified based on the length field in the L-SIG field of an ongoing PPDU and the HE-SIG-A field. More particularly, it should be understood that 802.11-type APs and STAs typically remain in a receive mode to detect a frame in the air. Thus, the existence of an ongoing frame is established after detecting and parsing the L-STF portion of the PPDU/frame (it should be understood that as used herein, the terms "frame," "packet," and "PPDU" can be used interchangeably). This is followed by detection and parsing of the L-LTF portion of the PPDU, which is followed by detection and parsing of the L-SIG, which contains the information for calculating the length of the remainder of the PPDU/frame (which includes the data portion/payload). This is then followed by detecting and parsing of the HE-SIG-A filed which contains BSS color information. Upon parsing the HE-SIG-A field (as well as the HE-SIG-B field in the case of an MU packet), the decision to apply or not apply SR for the remainder of that ongoing PPDU/frame can be made. If the ongoing PPDU/frame is either SU or MU, SR would occur or be applied over the ongoing PPDU/frame. SR does not occur over trigger frames, but in the case of an HE TB PPDU/frame, SR can be applied (a decision can be made to apply SR upon receipt of the HE TB PPDU subsequent to receipt of a trigger frame.

Upon determining the PPDU format, hardware processor 302 may execute instruction 308 to calculate a length of a data payload of the incoming packet. As alluded to above, the length of the data payload can be a function of PPDU format. To determine the length of the data section (414 in FIGS. 4A-4D), consider "TXTIME" to be the duration of the PPDU in microseconds (μs). As set forth in the 802.11ax specification (Draft 6.0 in particular), the length field carried in the L-SIG field can be defined as follows:

$$\text{Length} = \left(\frac{TXTIME - SignalExtension - 20}{4}\right)3 - 3 - m$$

It should be understood that "m" can have a value of 1 for HE MU PPDUs and HE ER SU PPDUs. Otherwise, the value of m is 2. Given the value of SignalExtension is zero (in a 5 or 6 GHz context), TXTIME may be estimated as follows:

TXTIME=(Length+m+3)4/3+20 μs

It should be understood that SignalExtension can refer to a duration extension of a data unit. In the 2.4 GHz context, the SignalExtension value is 6 us, whereas for the 5 or 6 GHz context, the value is zero. The above equation can be adapted for the 2.4 GHz context by setting the SignalExtension value to 6 us.

Table 1 below identifies which PPDUs are available to be transmitted during an SR opportunity as a function of SR type, while also classifying the type of PPDU used for each transmission. It should be understood that various embodiments are applicable to both downlink (DL) and uplink (UL) packets. Similarly, various embodiments can be applied to SU, MU, TB-type PPDUs.

TABLE 1

| SR TYPE | SU | DL MU | UL MU |
|---|---|---|---|
| Non-SRG/SRG | YES(HE = SU) | YES(HE-MU) | YES (HE-TB) |
| PSR | NO | NO | YES (HE-TB) |

Let the transmission times for the following fields be defined as set forth in Table 2 below:

TABLE 2

| T_Data | Transmission time for data payload |
|---|---|
| T_L_STF | Transmission time for L-STF, fixed 8 us |
| T_L_LTF | Transmission time for L-LTF, fixed 8 us |
| T_L_SIG | Transmission time for L-SIG, fixed 4 us |
| T_RL_SIG | Transmission time for RL-SIG, fixed 4 us |
| T_HE_STF | Transmission time for HE-STF, 4 or 8 us. This is a function of PPDU format. |
| T_HE_LTF | Transmission time for HE-LTF. The number of HE-LTF symbols (N_HE_LTF) is a function of NSS of PPDU and PPDU format as defined by 802.11ax specification |
| T_PE | Transmission time for PE, 0, 4, 8, 12 or 16 us |

It should be understood that embodiments of the present disclosure may be adapted to comport with different ways to calculate length calculations based on, e.g., future PPDU syntax.

Furthermore, "Data_mcs" can refer to the modulation and coding scheme (MCS) used for data transmission by an AP. The value of the MCS parameter may be derived from the HE-SIG-A or HE-SIG-B (or both) fields of the HE SU/MU PDDUs. For HE TB PPDUs, the preceding trigger frame may be captured to determine the MCS and resource unit(s) (RU(s)) assigned on a per-user basis. Further still, "L_Data" can refer to the calculated length of the data section of a received PPDU in bytes.

The transmission time for a data payload in the context of HE SU PPDUs and HE TB PPDUs can be represented as follows:

$$T\_Data=(TXTIME)-(T\_L\_STF)-(T\_L\_LTF)-(T\_L\_SIG)-(T\_RL\_SIG)-(T\_HE\_SIG\_A)-(T\_HE\_STF)-(T\_HE\_LTF \times N\_HE\_LTF)$$

The transmission time for a data payload in the context of HE MU PPDUs can be represented as follows:

$$T\_Data=(TXTIME)-(T\_L\_STF)-(T\_L\_LTF)-(T\_RL\_SIG)-(T\_HE\_STF)-(T\_HE\_LTF \times N\_HE\_LTF)-(T\_HE\_SIG\_A)-(T\_HE\_SIG\_B)-(T\_PE)$$

In other words, the length of the preamble of a PPDU can be subtracted from the total PPDU length to arrive at the length of the data section of the PPDU, where L_Data is a function of T_Data and Data_mcs, i.e., $L\_Data=f(T\_Data, Data\_mcs)$.

As alluded to above, important traffic, characterized by short data section lengths, such as voice traffic and TCP ACK messages, can be protected from being transmitted over by another transmission on the same channel/medium. Accordingly, upon determining the length of the data section of an ongoing PPDU, that determined length is compared to the length of a (voice or TCK ACK) Physical Layer Conformance Procedure Service Data Unit (PSDU). That is, hardware processor 302 may execute instruction 310 to correlate the length of the data payload with a packet type.

In this way, a determination can be made as to whether or not the calculated data payload length corresponds to a short packet (voice or TCP ACK) that when being transmitted, should be free from other OBSS transmissions on the same channel/medium, i.e., free from simultaneous SR traffic/transmissions.

It should be understood that the 802.11 physical layer is divided into two sublayers, the PLCP and Physical Medium Dependent (PMD) sublayers. The PLCP sublayer prepares a frame for transmission by taking a frame from the MAC sublayer, and creating a PPDU. The PMD sublayer than modulates and transmits the data as bits. In particular, when the MAC PDU (MPDU) is handed down to the physical layer, it is referred to as a PSDU. When the PLCP receives the PSDU, it prepares the PSDU for transmission by creating a PPDU (by adding a preamble and PHY header to the PSDU).

To determine the length of a voice PSDU, the length/number of bytes corresponding to each PSDU field can be added up. It should be noted that an assumption is made that voice packets are not going to be aggregated. It is understood that 802.11ax packets can support multi-traffic identifier (TID) aggregation in the form of, e.g., Multi-TID Aggregated MAC Protocol Data Units (AMPDUs) which allows frames from multiple TIDs from the same/different QoS access categories to be aggregated and sent together. Nevertheless, support for this feature is not yet widespread, and thus the assumption that voice packets are not typically aggregated is considered a valid/fair assumption that can be made. It should be noted that because AMPDUs are longer packets, SR may be applied over an AMPDU. That is, orthogonal frequency division multiple access (OFDMA) typically gets used for voice packets instead of AMPDUs, where HE MU PPDUs are used for downlink transmissions, and HE TB PPDUs are used for uplink transmissions.

It should be understood that the data payload of a voice PSDU is a function of the codec used to encode the voice data, and is typically capped at about 160 bytes for most codecs. However, any other/new payload size may be considered. In addition to voice data payload, the following can contribute to PSDU length: MAC header (28 bytes); Counter Mode Cipher Block Chaining Message Authentication Code Protocol (CCMP) header (8 bytes); forward error correction (FEC) (4 bytes); link layer header (8 bytes); IP header (20 bytes); User Datagram Protocol (UDP) header (8 bytes); Real-Time Transport Protocol (RTP) header (12 bytes). It should be understood that the CCMP header length can be function of the encryption algorithm used when security is enabled. The result is that a voice PSDU is typically 248 bytes.

To determine the length of a PSDU resulting from a TCP ACK message, the number of bytes making up the following can be summed: TCP header (20 bytes); IP header (20 bytes); MAC header (28 bytes); CCMP header (8 bytes); FEC (4 bytes); Link layer header (8 bytes). This results in a length of 88 bytes for a PSDU resulting from a TCP ACK. Limiting the protection from SR to voice traffic or PPDU also covers protecting PPDUs carry some plurality of aggregated TCP ACKs, e.g., two to three TCP ACKs. For example, given the above example, where a voice PSDU is 248 bytes, two aggregated TCP ACK messages could be aggregated and still considered a short packet for SR purposes. It should be noted that any other short packet(s) whose PSDU length (single or combined) is smaller than a voice PSDU.

The length of a voice PSDU can be denoted as "L_Voice_PSDU," while the length of the PPDU data section resulting from the L_Voice_PSDU can be denoted as "L_Voice_apprx."

Hardware processor 302 may execute instruction 312 to allow or disallow the use of SR based on the determined packet type. That is, if L_Data≤L_Voice_apprx, the transmission of the outgoing packet does not use SR for channel access. An incoming packet/frame may be tagged as being short after preamble processing, and a decision to transmit over this packet vis-à-vis leveraging SR, can be made based on the calculated length of the packet.

Figure 5:
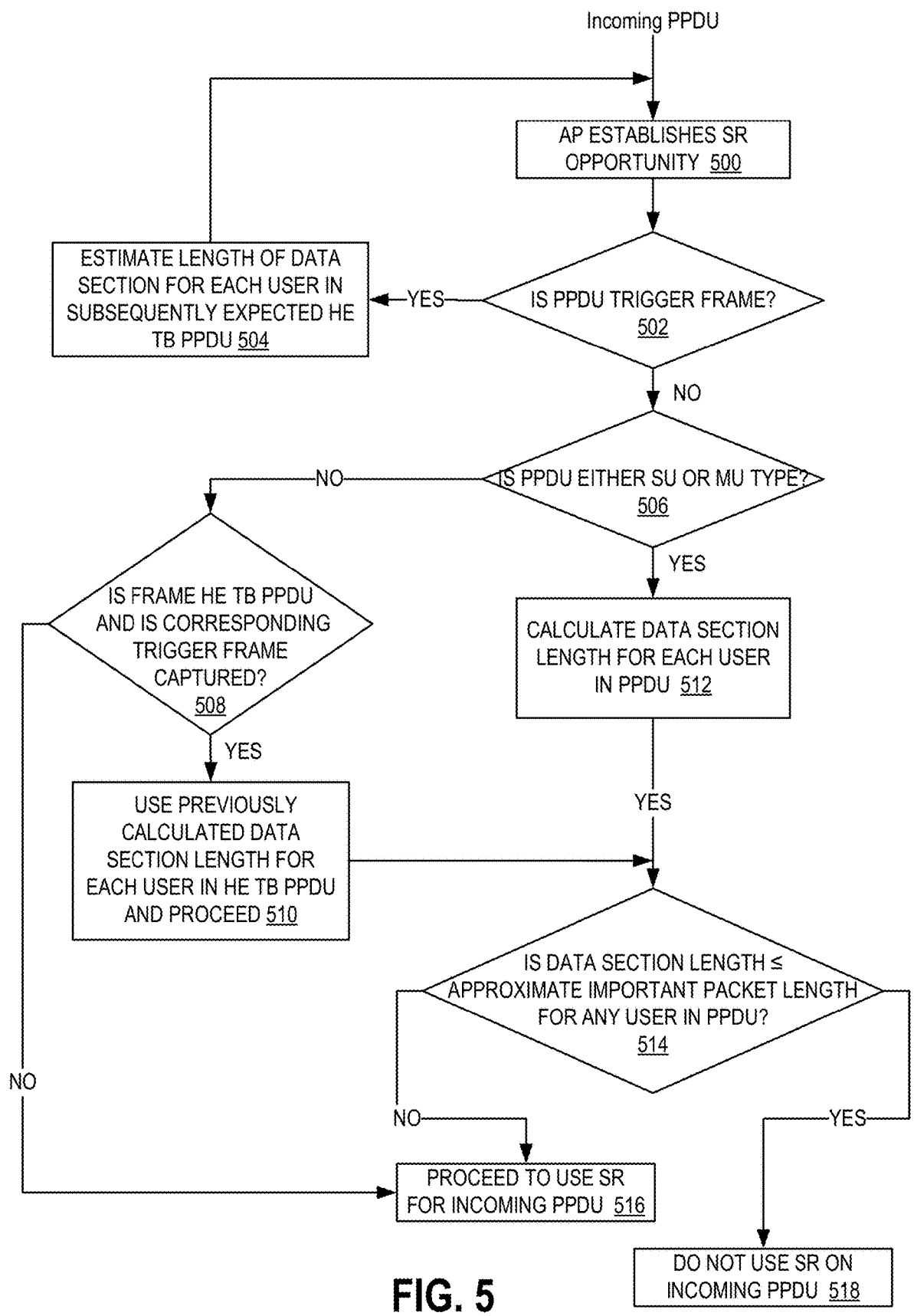
FIG. 5 is a flow chart illustrating example scenarios and operations for selective spatial reuse in accordance with one embodiment.

FIG. 5 is a flow chart illustrating various operations/stages performed/encountered while determining whether or not to allow data to be transmitted at the same time as other traffic on the same channel in accordance with the SR feature. At operation 500, pursuant to receiving an incoming PPDU at an AP, the AP establishes an SR opportunity. As would be understood by those skilled in the art, and according to the 802.11ax standard, APs can use BSS coloring procedures to determine the BSS color of Wi-Fi frames/packets the AP may hear. If the BSS color of heard Wi-Fi packets/frames is different from its own, the AP is in a position to utilize SR. It should be noted that SR applies to STAs and APs. Accordingly, the operations set forth in the flow chart of FIG. 5 (which, for example's sake, illustrates operations performed by an AP), can be adapted to any device capable of using/leveraging the SR feature.

At operation 502, the AP can determine if the PPDU is a trigger frame. If so, at operation 504, the length of the data section for each user in subsequently expected HE TB PPDU is estimated as described above. That is, L_Data=$f$(T_Data, Data_mcs), where T_Data=(TXTIME)−(T_L_STF)−(T_L_LTF)−T_L_SIG)−(T_RL_SIG)−(T_HE SIG_A)−(T_HE_STF)−(T_HE_LTF×N_HE_LTF)−T_PE. This length information can be cached, buffered, or otherwise stored, and the AP can again wait for a subsequent PPDU. It should be understood that typically, after an AP sends a trigger frame(s), STA(s) respond within a Short Interframe Space (SIFS) interval after receipt of the trigger frame(s). Accordingly, in some embodiments, a check can be performed to determine if a SIFS follows the trigger frame, and additionally. if a subsequently expected trigger-based TB PPDU follows the SIFS. A length of a data section for each user can be determined in a subsequently expected TB PPDU based on the trigger frame upon determining that the TB PPDU follows the SIFS and the SIFS follows the trigger frame.

If the incoming PPDU is not a trigger frame, at operation 506, a determination can be made as to whether or not the incoming PPDU is either an SU or MU-type of PPDU. If the PPDU does not correspond to either single or multi-user traffic, at operation 508, the AP can check to determine if the PPDU frame is an HE TB PPDU, and if the corresponding trigger frame has already been captured. If so, at operation 510, the AP can use the previously calculated, per-user data section length(s) and proceed with the process at operation 514 (described below). It should be understood (regarding the per-user section lengths) that an MU PPDU can be used to transmit a downlink MU-MIMO packet or downlink OFDMA PPDU. A single PPDU may be used to carry packets for multiple STAs/users.

If the incoming PPDU is indeed, an SU or MU-type PPDU, the AP can calculate the length of the PPDU's data section for each user at operation 512. As described above, the data section length of an HE SU PPDU is L_Data=$f$(T_Data, Data_mcs), where T_Data=(TXTIME)−(T_L_STF)−(T_L_LTF)−(T_L_SIG)−(T_RL_SIG)−(T_HE SIG_A)−(T_HE_STF)−(T_HE_LTF×N_HE_LTF)−T_PE. The data section length of an HE MU PPDU is L_Data=$f$(T_Data, Data_mcs), where T_Data=(TXTIME)−(T_L_STF)−(T_L_LTF)−(T_L_SIG)−(T_RL_SIG)−(T_HE_STF)−(T_HE_LTF×N_HE_LTF)−(T_HE_SIG_A)−(T_HE_SIG_B)−T_PE.

The process proceeds to operation 514, where the AP can check to determine if the data section length is less than or equal to the approximate important (e.g., voice) packet length (L_Voice_apprx) for any user in the PPDU. As described above with reference to FIG. 3, if the data section length is greater than the approximate voice packet length, the packet is not a short packet indicative of voice, TCP ACK (or other short packet), and SR can be utilized for the incoming PPDU at operation 516. At operation 518, and if the data section length is less than/equal to the approximate important packet length, the packet is a short packet indicative of voice, TCP ACK (or other short packet), SR is not utilized for an incoming PPDU. Thus, transmission of subsequent packets can be delayed if transmissions are occurring on the AP's operating channel via SR, until SR is no longer being used.

It should be understood that selective application of SR, as disclosed herein can increase the reliability of voice traffic, and hence improve the quality of voice calls (by not transmitting on the same channel simultaneously with voice traffic). Moreover, the reliability of TCP ACK transmissions can result in better TCP throughput and, in effect, better/enhanced network capacity. SR is, at the moment, only defined/specified for 802.11ax-compliant devices. Thus, legacy devices are not impacted.

Figure 6:
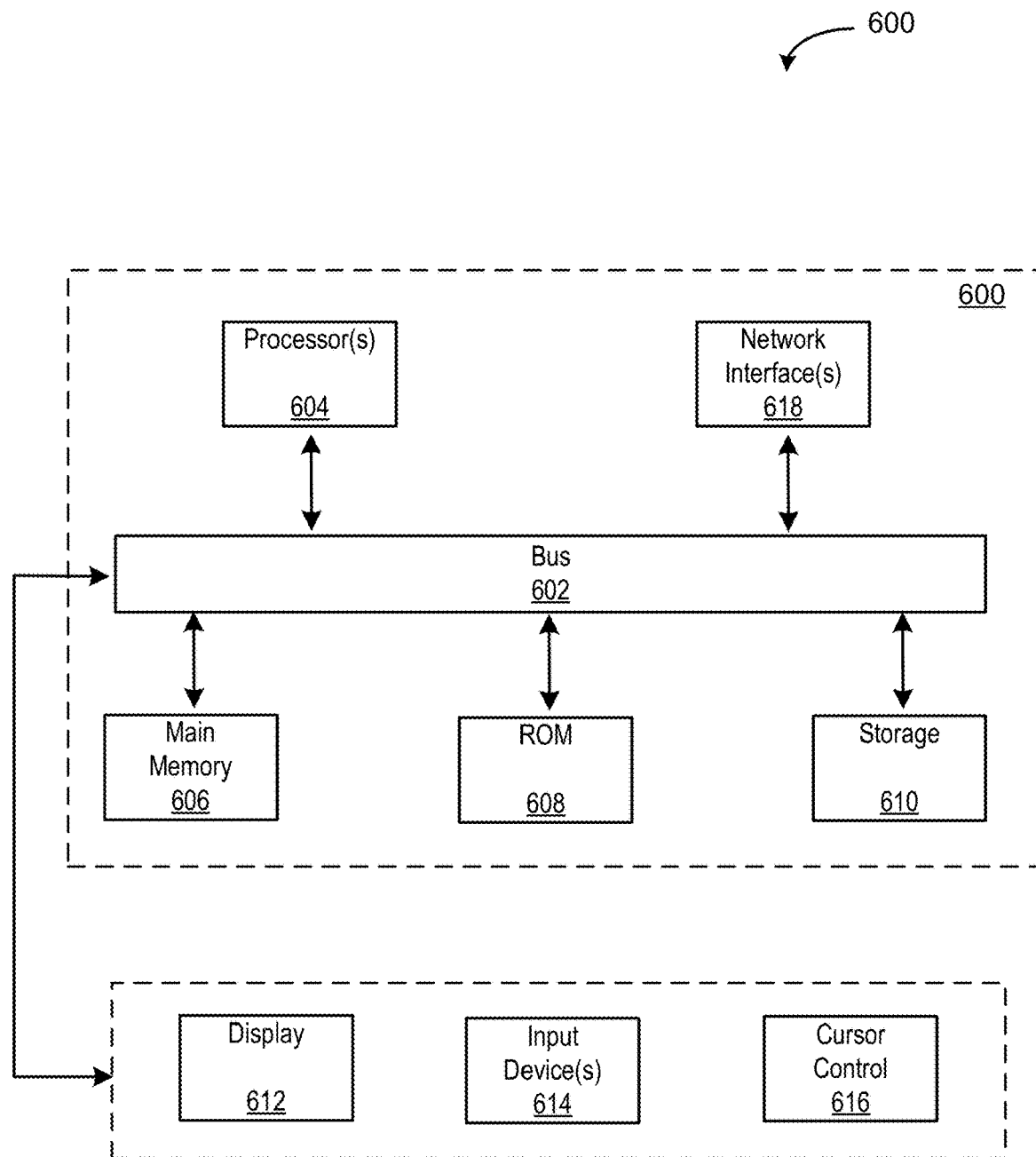
FIG. 6 is an example computing component that may be used to implement various features of embodiments described in the present disclosure.

FIG. 6 depicts a block diagram of an example computing/processing system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to:

receive a Physical Layer Protocol Data Unit (PPDU), wherein the PPDU comprises protocol-specific control information and user data from a wireless local area network (WLAN) device in a computer network;

identify a packet type of the PPDU;

when the packet type corresponds with a short packet, restrict transmitting of an outgoing PPDU; and when the packet type does not correspond with a short packet, allow the transmission of the outgoing PPDU simultaneously with another transmission occurring on the same transmission medium.

2. The non-transitory machine-readable storage medium of claim 1, wherein the instructions further cause the hardware processor to:

determine a length of a data section of the PPDU; and compare the length of the data section with a length of a data section of a PPDU corresponding to a short packet.

3. The non-transitory machine-readable storage medium of claim 2, wherein the short packet comprises one of a voice packet or a Transmission Control Protocol (TCP) Acknowledgement (ACK) message.

4. The non-transitory machine-readable storage medium of claim 1, wherein the length of the data section of the PPDU comprises a per-user length.

5. The non-transitory machine-readable storage medium of claim 1, wherein the PPDU or the subsequent PPDU has a format corresponding to one of a High Efficiency (HE) Single User (SU) PPDU format, a HE Multi-User (MU) PPDU format, a HE Trigger-Based (TB) PPDU format.

6. The non-transitory machine-readable storage medium of claim 1, wherein the PPDU or the subsequent PPDU is part of an uplink MU transmission or a downlink MU transmission.

7. The non-transitory machine-readable storage medium of claim 1, wherein instructions further cause the hardware processor to determine whether the PPDU comprises a trigger frame.

8. The non-transitory machine-readable storage medium of claim 7, wherein the instructions further cause the hardware processor to determine if a short interframe space (SIFS) follows the trigger frame.

9. The non-transitory machine-readable storage medium of claim 8, wherein the instructions further cause the hardware processor to determine if a subsequently expected trigger-based (TB) PPDU follows the short interframe space (SIFS).

10. The non-transitory machine-readable storage medium of claim 7, wherein the instructions further cause the hardware processor to estimate a length of a data section for each user in a subsequently expected trigger-based (TB) PPDU based on the trigger frame upon determining that the TB PPDU follows the SIFS and the SIFS follows the trigger frame.

11. The non-transitory machine-readable storage medium of claim 1, wherein the WLAN device comprises one of an access point or a client device.

* * * * *